United States Patent
Yano et al.

(10) Patent No.: US 9,456,065 B2
(45) Date of Patent: Sep. 27, 2016

(54) ELECTRONIC DEVICE

(71) Applicant: KYOCERA Corporation, Kyoto-shi, Kyoto (JP)

(72) Inventors: Kentaro Yano, Osaka (JP); Takeshi Saimyoji, Osaka (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 14/406,184

(22) PCT Filed: Jun. 4, 2013

(86) PCT No.: PCT/JP2013/065485
§ 371 (c)(1),
(2) Date: Dec. 5, 2014

(87) PCT Pub. No.: WO2013/183641
PCT Pub. Date: Dec. 12, 2013

(65) Prior Publication Data
US 2015/0141094 A1    May 21, 2015

(30) Foreign Application Priority Data
Jun. 5, 2012   (JP) .................................. 2012-127838

(51) Int. Cl.
*H04M 1/00* (2006.01)
*H04M 1/18* (2006.01)
(Continued)

(52) U.S. Cl.
CPC ................ *H04M 1/18* (2013.01); *F16B 21/04* (2013.01); *H04M 1/0262* (2013.01)

(58) Field of Classification Search
CPC ........... H04M 1/0262; H04M 1/0283; H04M 1/026; H04B 2001/3894; H04B 1/3833
USPC ...................... 455/575.8, 575.1, 572, 575.5, 455/90.1–90.3, 550.1, 73, 422.1, 403, 455/426.1, 426.2, 558; 340/539.1, 586, 340/12.5, 13.24, 13.25; 379/428.01, 379/433.08, 433.11, 433.1, 437, 440
See application file for complete search history.

(56) References Cited

U.S. PATENT DOCUMENTS

2008/0125197 A1* 5/2008 Hongo ................ H04M 1/0216
455/575.3

FOREIGN PATENT DOCUMENTS

| JP | 2001-53847 A | 2/2001 |
|---|---|---|
| JP | 2004-056164 A | 2/2001 |

(Continued)

OTHER PUBLICATIONS

International Search Report dated Sep. 3, 2013 issued in counterpart International Application No. PCT/JP2013/065485.

(Continued)

*Primary Examiner* — Keith Ferguson
(74) *Attorney, Agent, or Firm* — Procopio Cory Hargreaves and Savitch LLP (57) ABSTRACT

An electronic device according to the present invention includes a casing, a containing portion that is depressed in the casing to contain an electronic component, a lid body detachably mounted on the containing portion to water-tightly close the containing portion, and a lock operation piece that locks the lid body in the casing by rotation. The lock operation piece has a shaft portion projected toward the casing, and in an outer surface of the casing, a bottomed receiving portion into which the shaft portion is fitted is depressed.

7 Claims, 7 Drawing Sheets

(51) Int. Cl.
*F16B 21/04* (2006.01)
*H04M 1/02* (2006.01)

(56) References Cited

FOREIGN PATENT DOCUMENTS

| JP | 2005-129770 A | 5/2005 | | |
|---|---|---|---|---|
| JP | 2008-10599 A | 1/2008 | | |
| JP | 4424445 B1 | * 3/2010 | | |
| JP | 2011-94664 A | 5/2011 | | |
| JP | 2011-109221 A | 6/2011 | | |
| JP | WO 2011135729 A1 | * 11/2011 | ......... | H01M 2/1066 |

OTHER PUBLICATIONS

Office Action dated Aug. 2, 2016 issued in counterpart Japanese application No. 2012-127838.

* cited by examiner

ELECTRONIC DEVICE

TECHNICAL FIELD

The present invention relates to an electronic device including a lock operation piece that locks a lid body such as a battery lid while having waterproofness.

BACKGROUND ART

An electronic device such as a portable telephone having waterproofness is provided with a containing portion that contains detachable electronic components such as a battery in a casing. The containing portion is water-tightly closed by a lid body.

For example, in order to make the lid body detachable, there has been proposed an electronic device using a rotary lock operation piece that can lock the lid body in the casing.

The lock operation piece is rotatably attached to the casing by inserting a screw into a through-hole penetrating a wall of the casing.

In order to prevent entrance of water into the casing from the through-hole, a waterproof structure such as packing is required around the through-hole. This increases the number of components of the electronic device, which makes configurations of the respective components complicated. Furthermore, frequent operation of the lock operation piece, time degradation or the like degrades waterproofness of the waterproof structure, so that there is a possibility that water enters the casing from the through-hole.

Thus, there has been desired an electronic device including a lock operation piece that locks a lid body such as a battery lid while having waterproofness.

SUMMARY OF THE INVENTION

An electronic device according to the present invention includes:

a casing having a bottomed receiving portion, and a containing portion that is depressed to contain an electronic component;

a lid body detachably mounted on the containing portion to water-tightly close the containing portion; and a lock operation piece having a shaft portion that is projected toward the casing to be fitted into the bottomed receiving portion, the lock operation piece locking the lid body in the casing by rotation.

DETAILED DESCRIPTION OF EMBODIMENTS

Figure 1:
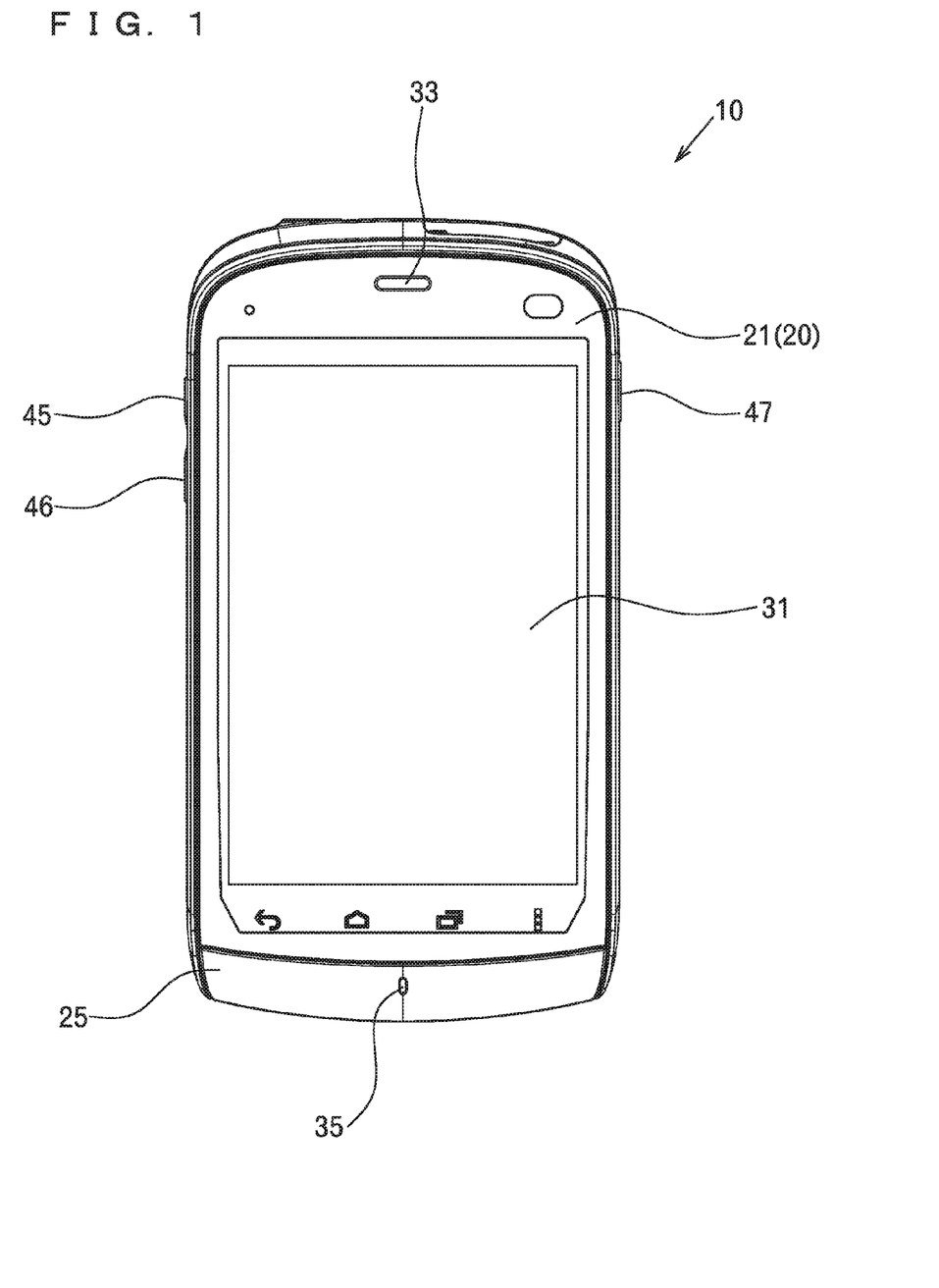
FIG. 1 is a front view of a portable electronic device according to one embodiment of the present invention.
Figure 2:
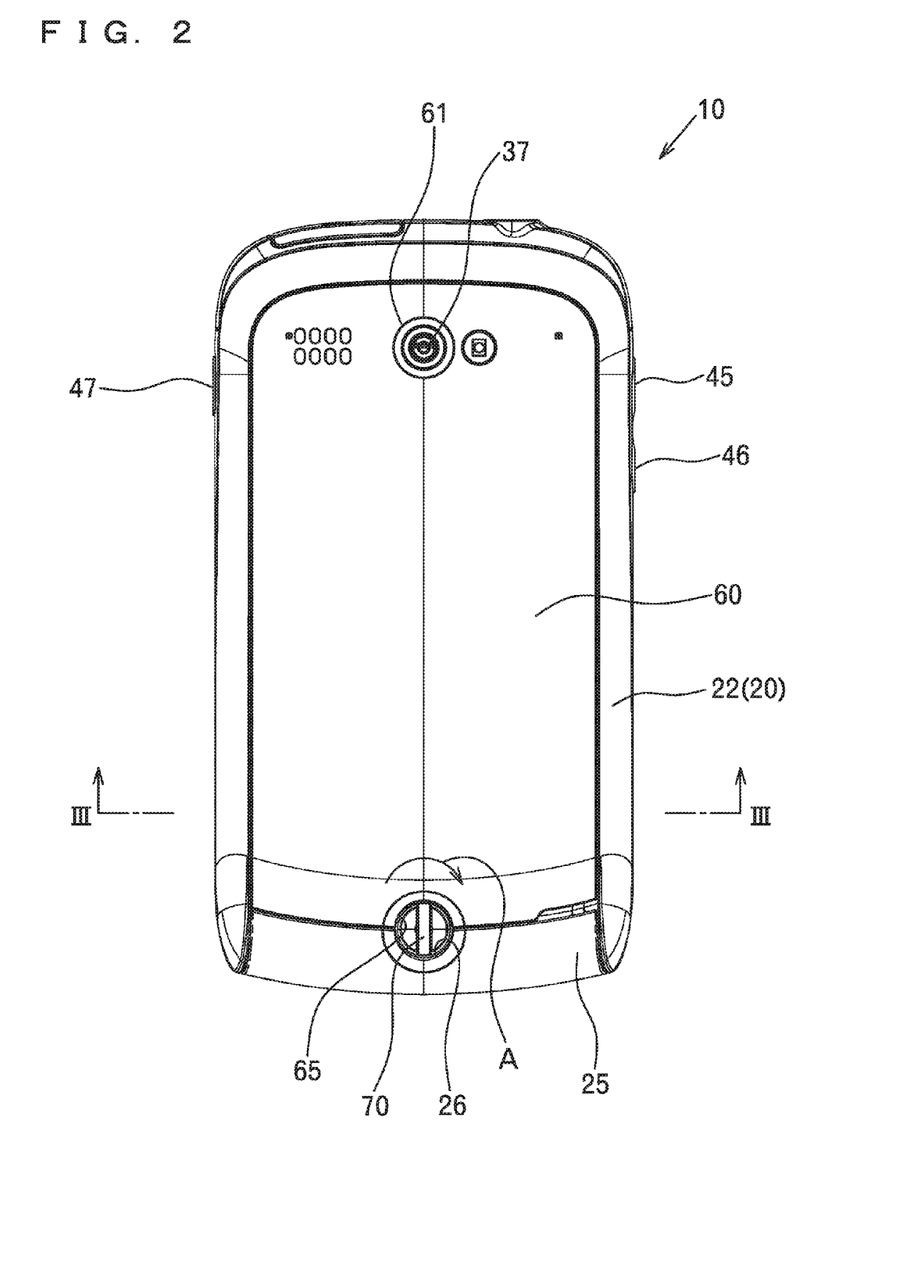
FIG. 2 is a back view of the portable electronic device according to the one embodiment of the present invention.
Figure 3:
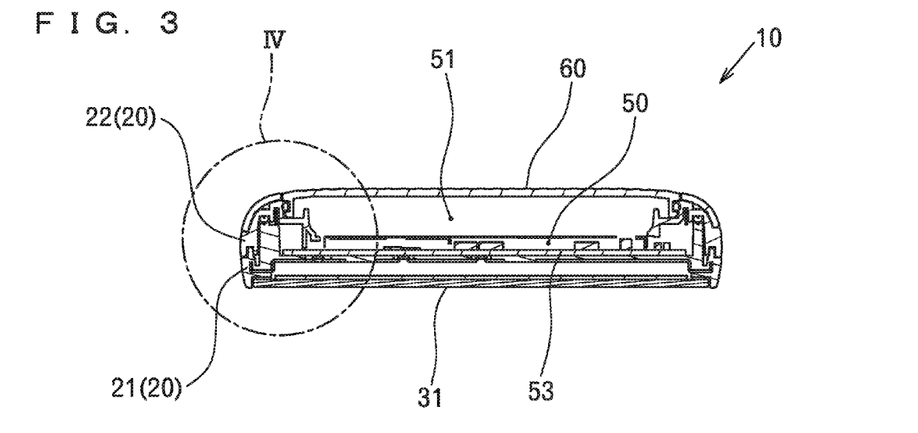
FIG. 3 is a cross-sectional view along line III-III in FIG. 2.
Figure 4:
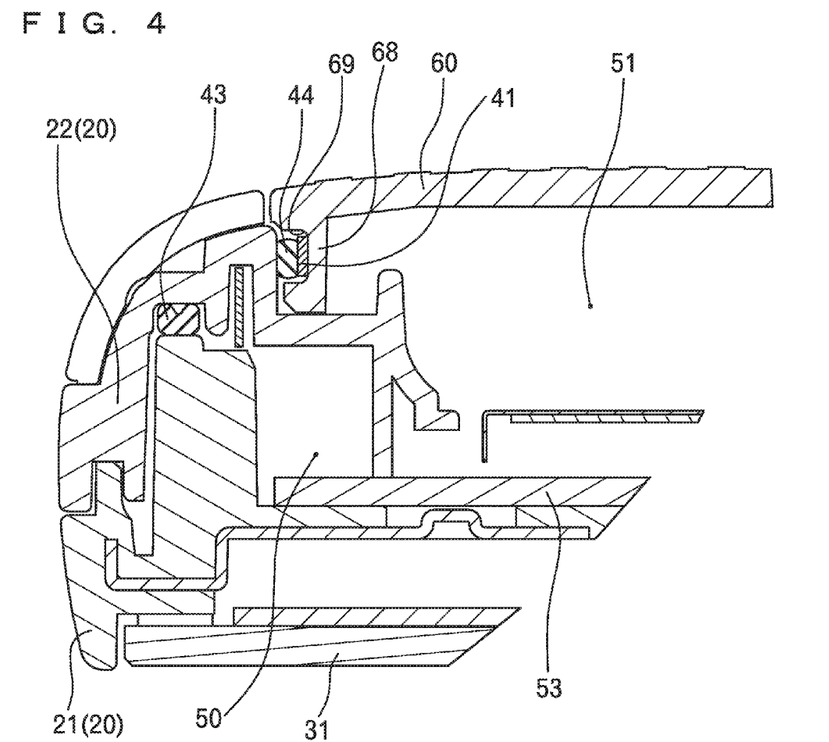
FIG. 4 is a cross-sectional view of a portion surrounding by circle IV in FIG. 3.
Figure 5:
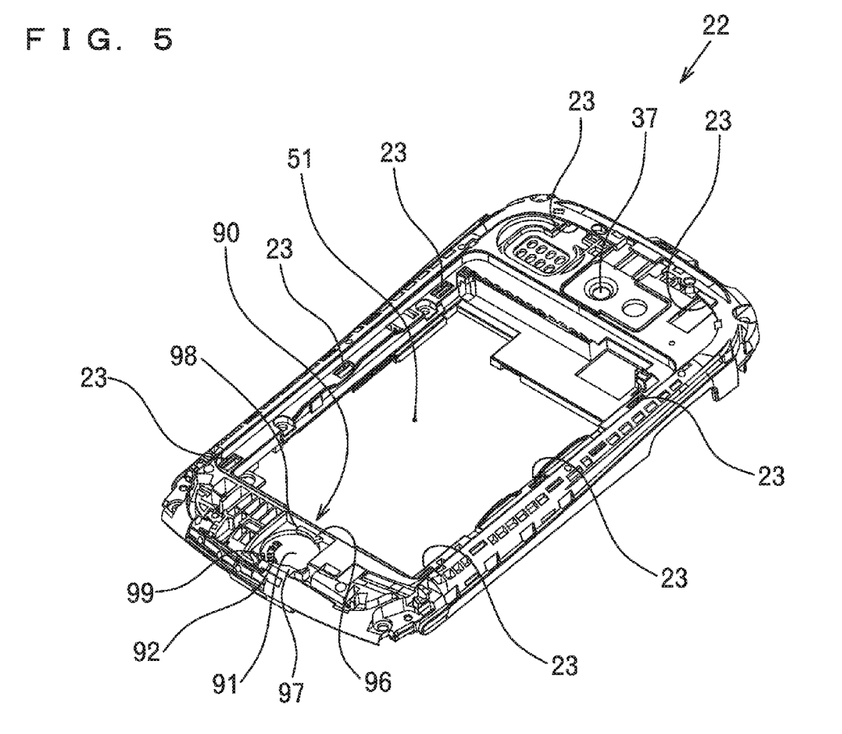
FIG. 5 is a perspective view when a back cover of the portable electronic device according to the one embodiment of the present invention is viewed from a back surface side.

The present invention relates to an electronic device 10 having waterproofness, as shown in FIGS. 1 and 2. More specifically, the electronic device 10 includes a containing portion 51 that contains electronic components such as a battery and a SIM card, as shown in FIGS. 3 to 5. The containing portion 51 is water-tightly closed by a lid body 60, as shown in FIGS. 2 to 4. The lid body 60 is locked and unlocked by rotating a lock operation piece 70 shown in FIG. 2.

Hereinafter, as an example of the electronic device 10, a portable telephone will be illustrated.

FIGS. 1 and 2 show an exterior of the portable telephone 10 as one embodiment of the present invention, and FIGS. 3 and 4 show cross-sectional views each showing an inside of the portable telephone 10.

The portable telephone 10 includes a casing 20 in which a front cover 21 and a back cover 22 are water-tightly engaged with each other through waterproof packing 43 (FIG. 4) or the like.

On the front cover 21, as shown in FIG. 1, a display portion 31 including a liquid crystal display panel and a touch panel that display various types of information is water-tightly mounted through waterproof packing or the like. Moreover, similar to the front cover 21, a waterproof space 50 (FIGS. 3 and 4) is formed inside.

In the front cover 21, a speaker 33 for telephone call is provided at one end in a longitudinal direction, which is an upper side in FIG. 1, and a microphone 35 for telephone call is provided on an another end side. A lower end of the casing 20 is covered by a substantially U-shaped decorative cover 25.

In side surfaces of the casing 20, as shown in FIGS. 1 and 2, various operation buttons 45, 46, 47 such as a power key, a volume and zoom adjustment button, a shutter button and the like are arranged.

As shown in FIGS. 3 and 4, in the waterproof space 50 inside the casing 20 is contained a circuit board 53 on which a communication circuit for telephone call and communication, and an electronic circuit executing operations of an operating system and applications, and various types of control of the portable telephone 10 are mounted. The circuit board 53 can be attached to an inner surface side of the front cover 21 together with the display portion 31.

In the back cover 22, as shown in FIGS. 3 to 5, the containing portion 51 containing the electronic components (not shown) such as the battery, a memory card, the SIM card and the like, which can be mounted on the casing 20 and can be detached from the casing 20, is provided so as to be connected to the waterproof space 50. The containing portion 51 is water-tightly closed by mounting the lid body 60 on the back cover 22, as shown in FIG. 2.

The lid body 60 can be configured such that a plurality of claw pieces 64 (FIG. 6) are projected in an upper end surface and side surfaces, and the claw pieces 64 can be locked in claw receiving portions 23 (FIG. 5) formed around the containing portion 51. Moreover, the lid body 60 is locked in the back cover 22 or is unlocked from the back cover 22 by rotating the lock operation piece 70 (FIG. 2).

A configuration may be employed, in which the lid body 60 is connected to the casing 20 at the upper end surface or the side surface thereof by hinges and the like.

Figure 6:
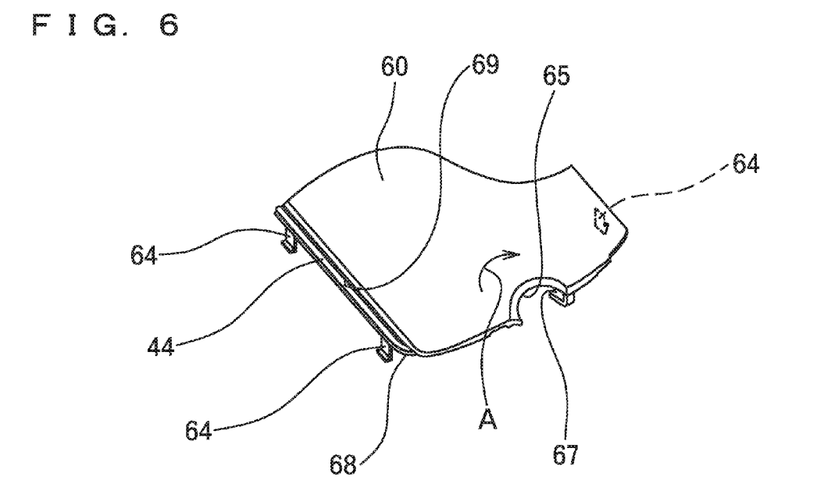
FIG. 6 is a perspective view of an essential portion of a lid body according to the one embodiment of the present invention.

In the vicinity of a circumferential surface of the lid body 60, a rib 68 opposed to an inner wall of the containing portion 51 is provided upright on an inner surface side, as shown in FIGS. 4 and 6. In an outer circumference of the rib 68, a groove 69 into which packing 44 to water-tightly close the containing portion 51 and the lid body 60 is fitted is depressed.

The packing 44 can be manufactured from an elastic member such as rubber, resin and the like. On the other hand, when the portable telephone 10 is subjected to impact by falling or the like, the lid body 60 is displaced to an open side because of a difference in rigidity between the lid body 60 and the back cover 22, so that the packing 44 may be fitted into a caused gap.

Thus, the packing 44 is desirably fixed to the groove 69 by adhesion or the like. For example, the packing 44 can be fixed to the groove 69 by a double-faced tape 41, as shown in FIG. 4. Meanwhile, since the gap caused by the impact is likely to be caused in a longitudinal direction of the portable telephone 10, the double-faced tape 41 may be stuck at least in a longitudinal direction of the lid body 60.

Fixing the packing 44 to the groove 69 can prevent the packing 44 from being fitted into the gap even if the portable telephone 10 is subjected to impact, so that waterproofness can be enhanced.

In addition, an opening 61 from which a lens 37 for camera function faces outward, and so on are formed at one end in the longitudinal direction of the lid body 60, which is an upper side thereof, as shown in FIG. 2.

Moreover, on another end side of the lid body 60, a semicircular cutout portion 65 into which the lock operation piece 70 is turnably fitted is formed, as shown in FIGS. 2 and 6.

In the cutout portion 65, a lock groove 67 into which a lock piece 87 of the lock operation piece 70 described later is fitted is formed at clockwise (a direction of arrow A in the figure) one end of the lock operation piece 70, which is a lock direction of the lock operation piece 70.

Figure 11:
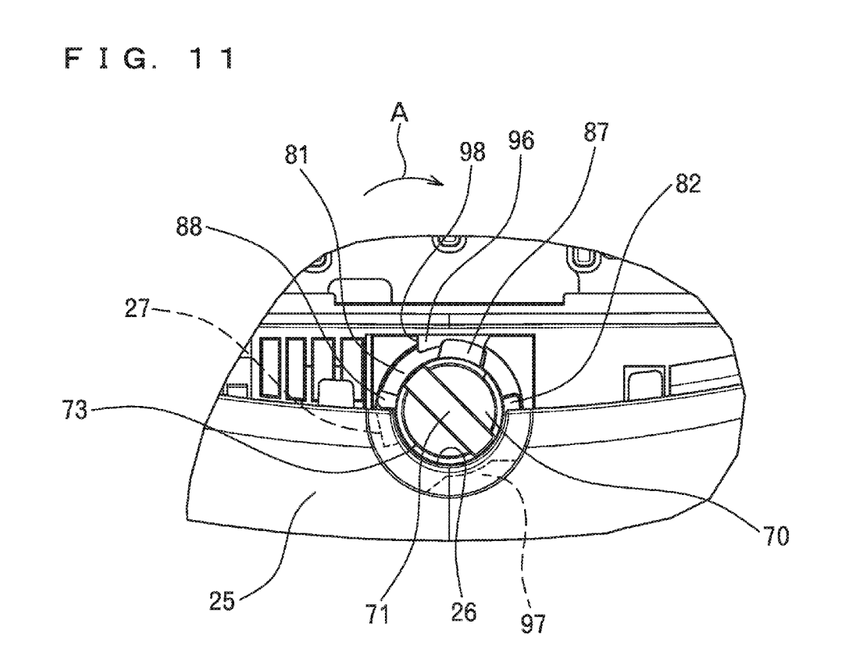
FIG. 11 is a back view showing an unlocked state of the lock operation piece of the portable electronic device according to the one embodiment of the present invention.

The decorative cover 25 covering the lower end of the casing 20 has a substantially U shape, and is formed with a semicircular cutout portion 26 (FIGS. 2 and 11) continuing to the semicircular cutout portion 65 of the lid body 60 to make up a circular through-hole. In a cutout portion 26 of the decorative cover 25, at one end thereof, an unlock-side regulating piece 27 that regulates a rotation angle of the lock operation piece 70 is projected in a direction extending toward an inner surface of the casing 20 (FIG. 11).

The foregoing lid body 60 can be mounted on or detached from the casing 20 by rotating the lock operation piece 70 attached to the casing 20, as shown in FIG. 2.

More specifically, the lock operation piece 70 is attached to a receiving portion 90 (FIG. 5) depressed in the casing 20. The receiving portion 90 can be formed in the same surface as the foregoing containing portion 51 depressed in the casing 20.

The receiving portion 90 may be a bottomed depression depressed in an outer surface of the back cover 22 adjacent to the containing portion 51, as shown in FIG. 5. The receiving portion 90 can have a shallow cylindrical inner surface, whose bottom surface 91 is circular.

Abutment pieces 96, 97 are projected inward at a distance from the bottom surface 91 of the receiving portion 90 on an opening side of the receiving portion 90, and retaining pieces 81, 82 of the lock operation piece 70 described later (FIGS. 7 to 9) are slidably fitted into between the abutment pieces 96, 97 and the bottom surface 91 of the receiving portion 90.

Figure 10:
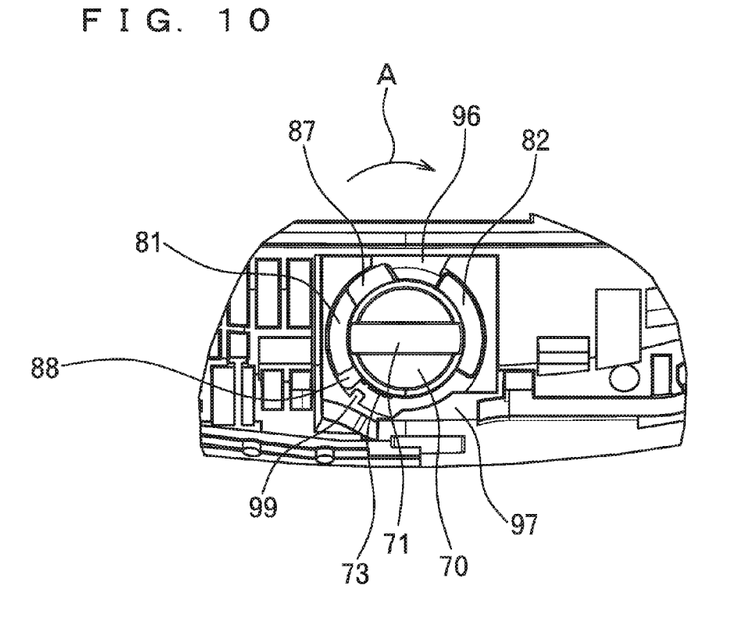
FIG. 10 is a back view showing a procedure for attaching the lock operation piece of the portable electronic device according to the one embodiment of the present invention.

In the illustrated embodiment, the two abutment pieces 96, 97 are provided, and are formed at a distance from each other in a circumferential direction of the receiving portion 90 so as to be almost opposed to each other. As shown in FIG. 10, the retaining pieces 81, 82 of the lock operation piece 70 can be inserted from gaps formed between the abutment pieces 96, 97.

Figure 12:
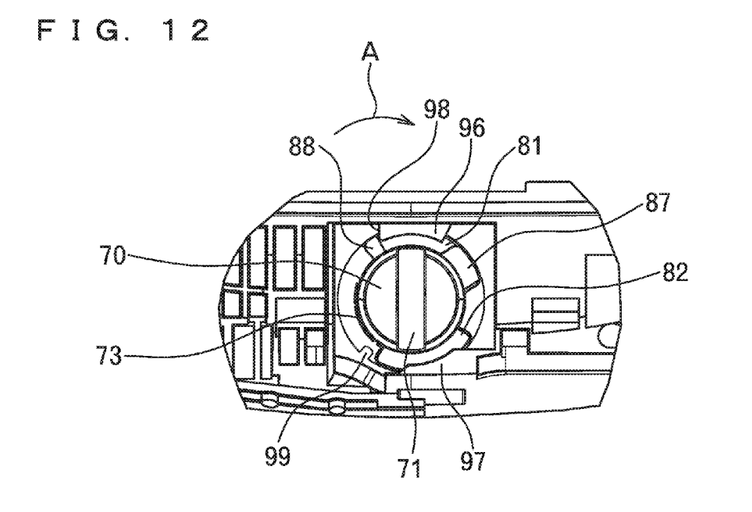
FIG. 12 is a back view showing a locked state of the lock operation piece of the portable electronic device according to the one embodiment of the present invention with the lid body and a decorative cover detached.

As shown in FIG. 5, forefronts of the abutment pieces 96, 97 are each formed into a circular ark shape concentric with the receiving portion 90, and a shaft portion 73 of the lock operation piece 70 described later is fitted into the forefronts of the abutment pieces 96, 97 to rotatably support the lock operation piece 70 (FIGS. 11 and 12).

In the receiving portion 90, regulating pieces 98, 99 that regulate the rotation angle of the lock operation piece 70 are projected in a direction toward a center of the receiving portion 90. In the illustrated embodiment, as shown in FIG. 5, the two regulating pieces 98, 99 are provided. The one regulating piece 98 is a lock-side regulating piece 98 that inhibits rotation beyond a locked position of the lock operation piece 70 described later, and can be configured so as to double as an end surface of the foregoing abutment piece 96. Moreover, the other regulating piece 99 is a regulating piece 99 for positioning when the lock operation piece 70 is attached.

Moreover, the receiving portion 90 is formed with a protrusion row 92 for preventing unintended rotation of the lock operation piece 70 and giving a click feeling to a user when the lock operation piece 70 is rotated.

As shown in FIG. 5, the protrusion row 92 is provided in the bottom surface 91 of the receiving portion 90, and a plurality of protrusions are provided side by side in a circular ark shape with the center of the receiving portion 90 used as a circular arc center.

Figure 7:
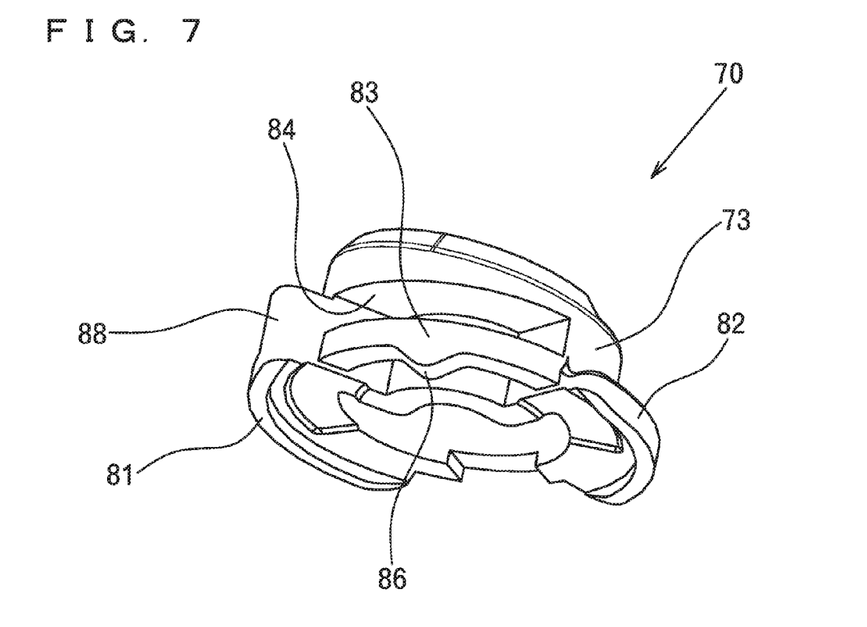
FIG. 7 is a perspective view when a lock operation piece of the portable electronic device according to the one embodiment of the present invention is viewed from a bottom surface side.

The lock operation piece 70 is rotatably fitted into the receiving portion 90. The lock operation piece 70 has the shaft portion 73 whose exterior is substantially columnar, as shown in FIGS. 7 to 9.

A top surface of the shaft portion 73 is inclined to go along a shape of the back cover 22 without being projected from the back cover 22 (FIG. 9) when the lock operation piece 70 is rotated to the locked position (FIG. 12).

Figure 8:
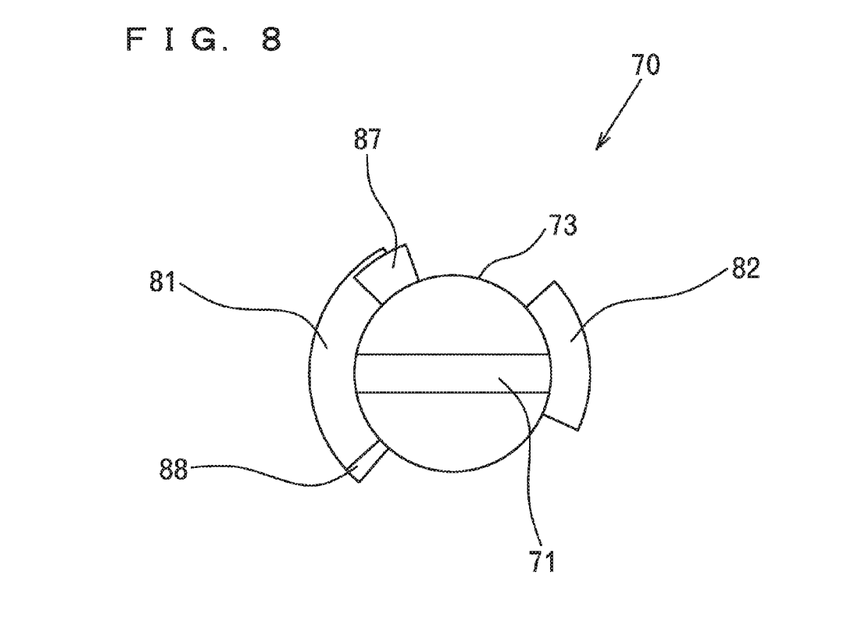
FIG. 8 is a view when the lock operation piece of the portable electronic device according to the one embodiment of the present invention is viewed from a top surface side.
Figure 9:
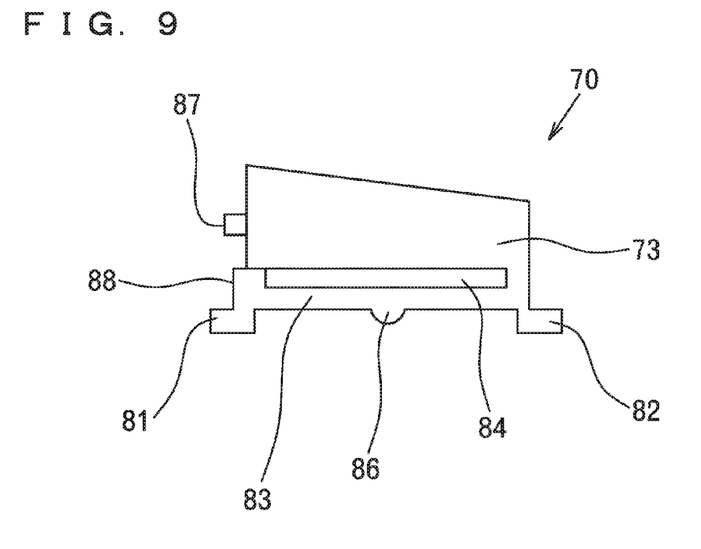
FIG. 9 is a side view of the lock operation piece of the portable electronic device according to the one embodiment of the present invention.

As shown in FIG. 8, in the top surface of the lock operation piece 70, a depression 71 for operation is provided in which a coin or the like can be inserted when the lock operation piece 70 is rotated. The depression 71 for operation is substantially parallel to a width direction of the portable telephone 10 at an attachment position of the lock operation piece 70 (FIG. 10), is substantially intermediate between the width direction and the longitudinal direction of the portable telephone 10 at an unlocked position (FIG. 11), and is substantially parallel to the longitudinal direction of the portable telephone 10 at the locked position (FIG. 12).

In a circumferential surface of the shaft portion 73, the plurality of projected pieces 81, 82, 87 are formed. The projected pieces denoted by reference numerals 81, 82 are retaining pieces, and are projected outward from a lower end of the shaft portion 73 with sizes and intervals enough to be fitted into between the abutment pieces 96, 97 of the foregoing receiving portion 90 at the attachment position (FIG. 10) of the lock operation piece 70.

The retaining pieces 81, 82 are formed a little thinner than these intervals between the abutment pieces 96, 97 and the bottom surface 91 of the receiving portion 90 so as to be slidable between these intervals.

In the one retaining piece 81, there is projected a regulated piece 88 that abuts on the foregoing regulating piece 99 for positioning to facilitate the positioning of the lock operation piece 70 at the time of attachment, and further abuts on the lock-side regulating piece 98 and the unlock-side regulating piece 27 at the locked time and at the unlocked time to regulate the rotation angle of the lock operation piece 70.

Moreover, the projected piece denoted by reference numeral 87 is a lock piece that is fitted into the lock groove 67 of the lid body 60 at the locked position to fix the lid body 60 lest the lid body 60 should come off. The lock piece 87 gets out of the lock groove 67 in the unlocked state to allow the detachment of the lid body 60.

As shown in FIGS. 7 and 9, in a bottom surface of the shaft portion 73, there is formed a projected portion 86 that moves while abutting on the protrusions on the protrusion row 92 of the foregoing receiving portion 90 when the lock operation piece 70 is rotated. The abutment of the projected portion 86 on the protrusion row 92 gives a resistance to the rotation of the lock operation piece 70 to inhibit free rotation of the lock operation piece 70, and gives a click feeling when the lock operation piece 70 goes over each of the protrusions of the protrusion row 92.

In the illustrated embodiment, in the operation of the lock operation piece 70 by the user, in order to smoothly rotate the lock operation piece 70, and enhance the click feeling, the projected portion 86 is provided in a circular arc-shaped, elastically deformable pole body 83 by forming a cutout 84 resulting from cutting out a part of the shaft portion 73. This allows the pole body 83 to be elastically deformed by the abutment of the projected portion 86 on the protrusion row 92, so that the retaining pieces 81, 82 can be strongly pressed against the abutment pieces 96, 97 of the receiving portion 90.

<Attachment of Lock Operation Piece>

The lock operation piece 70 having the above configuration is attached to the receiving portion 90 by inserting the retaining pieces 81, 82 into between the abutment pieces 96, 97 of the receiving portion 90 in a state where the decorative cover 25 is detached, as shown in FIG. 10. At this time, the regulated piece 88 of the lock operation piece 70 is inserted while abutting on the regulating piece 99 for positioning, which can facilitate the attachment of the lock operation piece 70.

From this state, as shown in FIG. 11, the lock operation piece 70 is rotated clockwise (in the direction of arrow A in the figure) to reach the unlock portion. The rotation of the lock operation piece 70 allows the retaining pieces 81, 82 to be fitted into the gaps between the abutment pieces 96, 97 and the bottom surface 91 of the receiving portion 90 and be opposed to the abutment pieces 96, 97, which makes it impossible that the lock operation piece 70 comes off.

After the lock operation piece 70 is rotated to the unlocked position, the decorative cover 25 is mounted on the lower end of the casing 20, as shown in FIG. 11. In the decorative cover 25, as described before, the unlock-side regulating piece 27 is projected, and the unlock-side regulating piece 27 and the regulated piece 88 of the lock operation piece 70 abut on each other at the unlocked position to regulate the counterclockwise rotation of the lock operation piece 70 from the unlocked position.

<Lock of Lid Body>

The lid body 60 is mounted on the casing 20 in the state where the lock operation piece 70 is at the unlocked position shown in FIG. 11 to close the containing portion 51, as shown in FIG. 2.

From this state, a coin or the like is inserted into the depression 71 for operation to rotate the lock operation piece 70 clockwise (in the direction of arrow A in the figure), as shown in FIG. 12 (the lid body is not shown). Thereby, in the lock operation piece 70, the lock piece 87 is fitted into the lock groove 67 of the lid body 60 shown in FIG. 6, so that the lock operation piece 70 fixes the lid body 60. When the lock operation piece 70 is rotated until the depression 71 for operation goes along the longitudinal direction of the portable telephone 10, as shown in FIG. 12, the regulated piece 88 of the lock operation piece 70 abuts on the lock-side regulating piece 98, thereby inhibiting the further rotation of the lock operation piece 70.

The foregoing allows the lid body 60 to be fixed by the lock operation piece 70, and the containing portion 51 to be closed in a water-tight state.

Meanwhile, the projected portion 86 on the bottom surface side of the lock operation piece 70 goes over the respective protrusions of the protrusion row 92 of the receiving portion 90 in the course of the rotation of the lock operation piece 70 from the unlocked position to the locked position, by which a proper rotation resistance is given and the click feeling is given.

Moreover, when the lock operation piece 70 is rotated up to the locked position, the unintended rotation of the lock operation piece 70 can be inhibited by the protrusions.

<Unlock>

A coin or the like is inserted into the depression 71 for operation from the locked position shown in FIG. 12 to rotate the lock operation piece 70 counterclockwise (in an opposite direction to the direction of arrow A in the figure). Thereby, in the lock operation piece 70, the lock piece 87 comes off the lock groove 67 of the lid body 60, so that the lid body 60 can be detached. As shown in FIG. 11, when the lock operation piece 70 is rotated up to the foregoing unlocked position, the regulated piece 88 of the lock operation piece 70 abuts on the unlock-side regulating piece 27, thereby inhibiting the further rotation of the lock operation piece 70.

The foregoing enables the lid body 60 to be detached, and opens the containing portion 51, which enables the mounting/detachment of the electronic components such as the battery and the like. Thereafter, in order to mount the lid body 60, the lock operation only needs to be again performed.

Since similar to the lock operation, the projected portion 86 of the lock operation piece 70 goes over the respective protrusions of the protrusion row 92 of the receiving portion 90 in the course of the rotation of the lock operation piece 70 from the locked position to the unlocked position, the proper rotation resistance is given and the click feeling is given.

Moreover, when the lock operation piece 70 is rotated up to the unlocked position, unintended rotation of the lock operation piece 70 can be inhibited by the protrusions.

According to the present invention, since the receiving portion 90 into which the lock operation piece 70 is fitted has the bottom, and does not penetrate the back cover 22, the waterproofness of the waterproof space 50 and the containing portion 51 inside the casing 20 is never impaired through the receiving portion 90.

Moreover, since no packing or the like needs to be mounted in the attachment of the lock operation piece 70, the number of components of the portable telephone 10 can be reduced, the configurations of the respective components can be simplified, and there is no fear that the waterproofness is degraded by frequent lock operation and time degradation.

Note that the configurations of the respective portions of the present invention are not limited to the above-described embodiment, but various modifications can be made within a technical range described in claims.

For example, the electronic device is not limited to the portable telephone, but can also be applied to a smartphone, a tablet type computer, a portable type music player, a notebook-sized personal computer or the like.

Moreover, the electronic components contained in the containing portion are not limited to the battery, the memory card, the SIM card and the like, but the containing portion may store terminals for charging, power supply and connection to other devices, and so on.

The present invention is useful as an electronic device including a lock operation piece that locks a lid body such as a battery lid while having waterproofness.

DESCRIPTION OF REFERENCE CHARACTERS 10. electronic device (portable telephone)
20. casing
51. containing portion
60. lid body
70. lock operation piece
73. shaft portion
90. receiving portion

The invention claimed is:

1. An electronic device comprising:
a casing comprising a bottomed receiving portion with a recessed substantially-flat circular bottom surface having no holes, and a containing portion that is depressed to contain an electronic component, wherein the recessed substantially-flat circular bottom surface comprises a protrusion row comprising a plurality of protrusions;
a lid body detachably mounted on the containing portion to water-tightly close the containing portion; and
a lock operation piece comprising
a shaft portion that is projected toward the casing to be fitted into the recessed substantially-flat circular bottom surface of the bottomed receiving portion, and
a projected portion that projects towards the recessed substantially-flat circular bottom surface so as to abut on the protrusion row,
wherein the lock operation piece locks the lid body in the casing by rotation.

2. The electronic device according to claim 1, wherein the bottomed receiving portion and the containing portion are formed on the same surface of the casing.

3. The electronic device according to claim 1, wherein the lock operation piece has a retaining piece projected from the shaft portion, and the bottomed receiving portion includes an abutment piece that is opposed to the retaining piece to prevent the lock operation piece from coming off.

4. The electronic device according to claim 1, wherein the lid body comprises a cutout portion into which the lock operation piece is rotatably fitted.

5. The electronic device according to claim 1, wherein the plurality of protrusions in the protrusion row are provided side-by-side in a circular arc around a center of the substantially-flat circular bottom surface.

6. The electronic device according to claim 5, wherein the projected portion comprises a deformable body formed in a circular-arc shape.

7. The electronic device according to claim 6, wherein the projected portion is formed by cutting out a part of the shaft portion, such that the deformable body elastically deforms as the projected portion rotates over one or more of the plurality of protrusions in the protrusion row.

* * * * *